US006973138B1

(12) United States Patent
Wright

(10) Patent No.: US 6,973,138 B1
(45) Date of Patent: Dec. 6, 2005

(54) ADVANCED ADAPTIVE PRE-DISTORTION IN A RADIO FREQUENCY TRANSMITTER

(75) Inventor: Andrew S. Wright, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 934 days.

(21) Appl. No.: 09/764,680

(22) Filed: Jan. 18, 2001

Related U.S. Application Data

(60) Provisional application No. 60/178,207, filed on Jan. 26, 2000.

(51) Int. Cl.[7] ............................................. H04L 25/03
(52) U.S. Cl. .................... 375/297; 375/296; 455/63.1; 455/114.3
(58) Field of Search ............................. 375/254, 255, 375/295, 296, 297; 455/63.1, 114.2, 114.3, 455/126, 127.1, 127.2; 330/149; 332/123, 332/124, 159, 160, 162

(56) References Cited

U.S. PATENT DOCUMENTS

| | | | |
|---|---|---|---|
| 4,291,277 A | 9/1981 | Davis et al. ................. | 330/149 |
| 4,329,655 A | 5/1982 | Nojima et al. ............... | 330/149 |
| 4,700,151 A | 10/1987 | Nagata ........................ | 332/123 |
| 4,810,977 A * | 3/1989 | Flugstad et al. ............. | 332/127 |
| 5,049,832 A | 9/1991 | Cavers ........................ | 330/149 |
| 5,089,782 A | 2/1992 | Pike et al. ................... | 324/623 |
| 5,093,667 A | 3/1992 | Andricos .................... | 342/372 |
| 5,675,285 A | 10/1997 | Winters ................... | 330/124 R |
| 5,682,336 A | 10/1997 | Chian et al. ..................... | 703/3 |
| 5,699,383 A * | 12/1997 | Ichiyoshi ..................... | 375/297 |
| 5,818,298 A | 10/1998 | Dent et al. ..................... | 335/10 |
| 5,842,140 A | 11/1998 | Dent et al. ................... | 455/573 |
| 5,900,778 A | 5/1999 | Stonick et al. ............... | 330/149 |
| 5,905,760 A | 5/1999 | Schnabl et al. .............. | 375/296 |
| 5,990,738 A | 11/1999 | Wright et al. ................ | 330/149 |

FOREIGN PATENT DOCUMENTS

| | | |
|---|---|---|
| DE | 3307309 A1 | 9/1984 |
| EP | 0544117 A1 | 10/1992 |
| EP | 0881807 A1 | 6/1993 |
| GB | 2282291 A | 3/1995 |

OTHER PUBLICATIONS

A. Bateman, D.M. Haines and R.J. Wilkinson, "Linear Transceiver Architectures," 38th IEEE Vehicular Technology Conference, Philadelphia, PA, pp. 478-484, dated Jun. 15-17, 1988.
R.D. Stewart and F.F. Tusubira, "Feedforward Linearisation of 950 MHz Amplifiers," IEE Proceedings, vol. 135, Pt. H, No. 5, pp. 347-350, dated Oct. 1988.

(Continued)

*Primary Examiner*—Chieh M. Fan
(74) *Attorney, Agent, or Firm*—Knobbe, Martens, Olson & Bear, LLP

(57) ABSTRACT

The present invention is related to methods and apparatus that advantageously permit the more efficient use of an input range of an analog-to-digital converter used by an adaptive predistortion linearized RF transmitter. A main signal component of a down-converted output of an RF transmitter is removed prior to the analog-to-digital conversion of the down-converted output, thereby allowing more of the input range of the analog-to-digital converter to capture an error signal component of the down-converted output. Embodiments of the present invention can thus adaptively tune the predistortion stage to a higher degree of linearity or can use lower cost analog-to-digital converters with fewer quantization steps for the same performance.

18 Claims, 4 Drawing Sheets

OTHER PUBLICATIONS

J.K. Cavers, "Amplifier Linearization Using a Digital Predistorter with Fast Adaptation and Low Memory Requirements," IEEE Transactions on Vehicular Technology, vol. 39, No. 4, pp. 374-382, dated Nov. 1990.

Y. Nagata, "Linear Amplification Technique for Digital Mobile Communications," IEEE Transactions on Vehicular Technology, pp. 159-164, (1989).

E.A. Lee and D.G. Messerschmitt, "Digital Communication," Kluwer Academic Publishers, Chapter 15, pp. 566-569, (1990).

A.A.M. Saleh and J.Salz, "Adaptive Linearization of Power Amplifiers in Digital Radio Systems," The Bell System Technical Journal, vol. 62, No. 4, pp. 1019-1033, dated Apr. 1983.

Andrew S. Wright and Willem G. Durtler, "Experimental Performance of an Adaptive Digital Linearized Power Amplifier," IEEE Transactions on Vehicular Technology, vol. 41, No. 4, pp. 395-400, dated Nov. 1992.

J. K. Cavers, "The Effect of Quadrature Modulator and Demodulator Errors on Adaptive Digital Predistorters for Amplifier Linearization," IEEE Transactions on Vehicular Technology, vol. 46, No. 2, pp. 456-466, May 1997.

L. Sundstrom, M. Faulkner, and M. Johansson, "Quantization Analysis and Design of A Digital Predistortion Linearizer for RF Power Amplifiers," IEEE Transactions on Vehicular Technology, vol. 45, No. 4, pp. 707-719, dated Nov. 1996.

M. Faulkner and M. Johansson, "Adaptive Linearization Using Predistortion—Experimental Results," IEEE Transactions on Vehicular Technology, vol. 43, No. 2, pp. 323-332, dated May 1994.

J. K. Cavers, "A Linearizing Predistorter with Fast Adaptation," 40th IEEE Vehicular Technology Conference, pp. 41-47, dated May 1990.

International Search Report for PCT Application No. PCT/IB/00/01038.

International Search Report for PCT Application No. PCT/IB/00/01044.

International Search Report for PCT Application No. PCT/IB/00/01047.

International Search Report for PCT Application No. PCT/IB/00/01049.

International Search Report for PCT Application No. PCT/IB/00/01051.

* cited by examiner

ADVANCED ADAPTIVE PRE-DISTORTION IN A RADIO FREQUENCY TRANSMITTER

RELATED APPLICATION

This application claims the benefit under 35 U.S.C. § 119(e) of U.S. Provisional Application No. 60/178,207, filed Jan. 26, 2000, the disclosure of which is hereby incorporated by reference.

BACKGROUND OF THE INVENTION

1. Field of the Invention

The present invention is generally related to communications systems. In particular, the present invention relates to linearizing Radio Frequency (RF) power amplifiers.

2. Description of the Related Art

Radio Frequency (RF) power amplifiers prepare a signal for transmission by increasing the power of the signal. The signal, such as a television signal, radio signal, or cell phone signal, can be transmitted through the air via an antenna. Other signals, such as those found in cable-TV systems, are transmitted through cables.

One class of RF power amplifiers is known as Class A. Class A amplifiers exhibit good intrinsic linearity but are relatively inefficient. A Class A amplifier can exhibit an efficiency as low as 1%. The efficiency is low because only a small portion of the potential output capability of a Class A amplifier can be used in order to maintain the operation of the amplifier in a linear region. When the overall power output is relatively high, a Class A amplifier can waste a lot of power and in turn, require bulky and expensive thermal management techniques to remove the excess heat generated.

Other classes of RF power amplifiers, such as Class AB, Class B, Class C, etc., are more efficient than a Class A amplifier, but are also intrinsically less linear. Non-linear amplification introduces distortion to the amplified RF signal. The distortion can manifest itself by harmonic frequencies and intermodulation.

Conventional methods attempt to correct the non-linearities of a nonlinear RF power amplifier by introducing Cartesian feedback, feedforward compensation, and predistortion techniques.

Cartesian feedback applies negative feedback to an RF transmitter, which includes an RF amplifier. A sample of the output of the RF amplifier is demodulated and fed back to the input of the transmitter. A disadvantage of Cartesian feedback, as a form of closed loop negative feedback, is that it must be unconditionally stable. Given the delay encountered in modulation and demodulation, the stability requirement gives rise to a relatively narrow operating bandwidth that is impractical for modern wideband code division multiple access (W-CDMA) cellular systems.

Feedforward is a technique in which an additional linear amplifier subtracts the artifacts of nonlinearity from the RF amplifier such that the RF transmitter produces a linearized output. An error signal is derived from comparison of the input to the RF amplifier and the output of the RF amplifier. The input to the RF amplifier is delayed to compensate for the delay through the RF amplifier. The error signal is then amplified by the additional linear amplifier and combined with a delayed output of the RF amplifier to reduce the distortion of the RF amplifier. The output of the RF amplifier is delayed prior to the subtraction in order to compensate for the delay encountered by the error signal through the additional linear amplifier. Feedforward techniques are open loop by nature and can operate over a relatively wide bandwidth. However, the matching of the delays through the RF power amplifier and the additional linear amplifier can be difficult to implement in practice. A mismatch in either or both of the delays seriously undermines the effectiveness of the distortion cancellation.

Predistortion is another conventional technique used to enhance the linearity of a nonlinear amplifier. A digital signal processor (DSP) predistorts the input signal by reference to a predistortion kernel with a complement of the expected distortion of the nonlinear amplifier.

A form of predistortion known as adaptive predistortion further enhances the effectiveness of predistortion by monitoring the output of the RF amplifier and updating the coefficients used by the DSP. A sample of the output of the RF amplifier is demodulated to baseband, and the baseband signal is analog-to-digital converted and applied to the DSP as an input. One disadvantage to present techniques of adaptive predistortion is the relatively limited range and relatively expensive cost of the analog-to-digital converter (ADC). The relatively limited dynamic range of the ADC limits the ability for adaptive predistortion techniques to cancel out nonlinearities.

SUMMARY OF THE INVENTION

The present invention solves these and other problems by providing adaptive predistortion circuits that efficiently use the dynamic range of an analog-to-digital converter (ADC) used to sample the distortion of an RF transmitter. A main signal component of a down-converted output of the RF transmitter is removed prior to the analog-to-digital conversion, thereby allowing relatively more of the input range of the analog-to-digital converter to capture the error signal within the down-converted output. Embodiments of the present invention can thereby adaptively tune the predistortion stage to a higher degree of linearity or can use lower cost analog-to-digital converters with fewer quantization steps for the same performance.

An embodiment of the present invention includes an RF transmitter whose input is adaptively predistorted in a complementary manner to the RF transmitter's intrinsic distortion to reduce the distortion in the output of the RF transmitter. Coefficients of the predistortion process are updated while the RF transmitter is operating to adaptively linearize the transmitter's output. A sample of the output of the RF transmitter is down-converted and combined with a delayed version of the input reference signal. The delayed version of the input reference signal can additionally be phase rotated and amplitude scaled such that the delayed version of the input reference signal further reduces a main signal component of the down-converted sample when the down-converted sample and the delayed version of the input reference signal are combined.

In a conventional system, the down-converted sample is converted by an analog-to-digital converter. As the main signal component is a substantial component of the magnitude of the down-converted sample, conventional systems do not fully utilize the dynamic range of the analog-to-digital converter to capture the error component of the down-converted sample.

In an embodiment according to the present invention, the combining of the down-converted sample with the delayed version of the input reference signal substantially reduces the main signal component of the combined signal while substantially maintaining the error component of the down-converted sample, thereby allowing an analog-to-digital converter to more accurately capture the error component. The combined signal advantageously allows the analog-to-digital converter to capture the error components in smaller and more precise quantization steps and can enhance the adaptive updates to the predistortion and thereby enhance the improvement to linearity of the predistortion, or allow the cost effective use of a simpler and cheaper analog-to-digital converter with fewer bits. One embodiment further includes adaptively scaling an amplitude of the modified down-converted signal or combined signal in response to the error signal from the analog-to-digital converter to conform the amplitude of the modified down-converted signal to an input range of the analog-to-digital converter.

One embodiment of the present invention further adaptively updates the delay, phase rotation, and amplitude scaling of the delayed input signal to improve the cancellation of the main signal component by the delayed input signal. One algorithm that adaptively tunes the delay, phase rotation, and amplitude scaling, seeks to decrease the power of the combined signal.

Embodiments of the present invention can be utilized with transmitters that directly up-convert from baseband to RF and transmitters that modulate data on an Intermediate Frequency (IF) that is subsequently up-converted to RF. One embodiment according to the present invention down-converts the RF to IF, and then demodulates the IF to complex baseband, by, for example, digital quadrature conversion. Another embodiment directly down-converts the RF to complex baseband.

In one embodiment, the predistortion circuit is implemented with dedicated hardware and predistortion kernels, and the predistortion circuit receives updates from a microprocessor to adaptively configure the predistortion characteristic to time-varying conditions of the transmitter. A complex finite impulse response (FIR) filter delays the input signal and can further rotate the phase and scale the magnitude of the delayed input signal. The complex FIR filter can be further configured to receive updates from the microprocessor to adaptively cancel the main signal component with the delayed input signal.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

DETAILED DESCRIPTION OF THE PREFERRED EMBODIMENTS

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

Embodiments of the present invention advantageously allow the efficient use of the dynamic range of an analog-to-digital converter (ADC) used to sample the output signal in an RF transmitter with an adaptive predistortion linearization circuit. In one embodiment, the efficient use of the dynamic range of the ADC enhances the linearity of the RF transmitter. In another embodiment, the efficient use of the dynamic range of the ADC allows a substitution of a less expensive ADC with no decrease in performance. These two benefits can be appropriately combined to achieve a desired cost/performance tradeoff.

Figure 1:
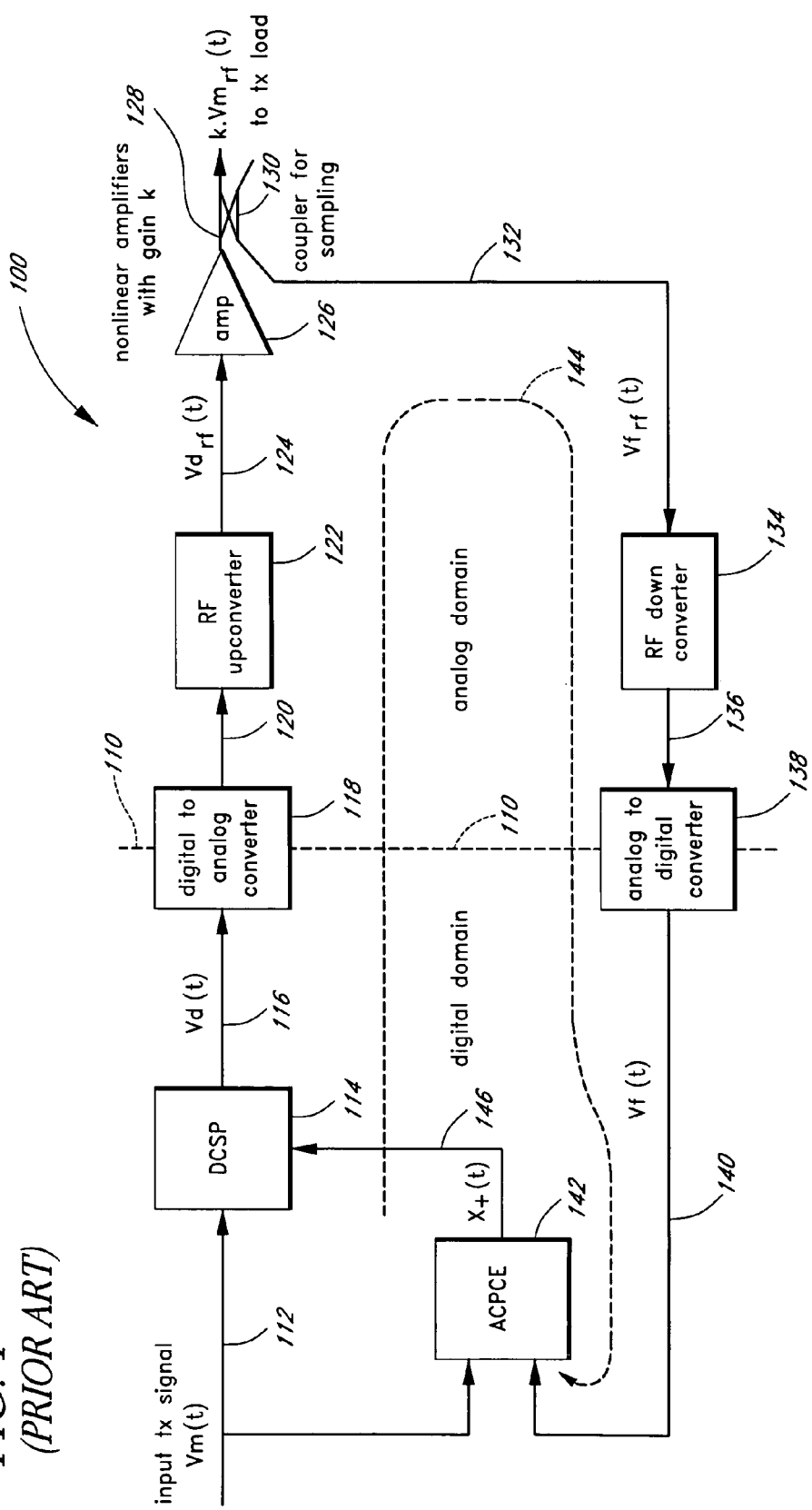
FIG. 1 illustrates a block diagram of an RF transmitter according to a conventional Adaptive Predistortion Linearization technique.

FIG. 1 illustrates a block diagram of a conventional RF transmitter 100 with adaptive predistortion. The RF transmitter 100 is part analog and part digital. Line 110 indicates the division between the analog portion and the digital portion. The RF transmitter 100 receives a digital input signal, $V_m(t)$ 112. As shown in FIG. 1, the input signal 112 is already modulated with, for example, code division multiple access (CDMA). The input signal 112 is applied to a digital compensation signal processing (DCSP) circuit 114. The DCSP circuit 114 predistorts the input signal 112 such that after amplification, the output of the RF transmitter 100 is less distorted. The DCSP circuit 114 references a predistortion kernel to determine how to predistort the input signal 112. As will be explained later, the coefficients of the predistortion kernel can be adjusted to account for time-varying nonlinearities.

A predistorted output signal 116 of the DCSP circuit 114 is applied to a digital-to-analog converter 118, which converts the predistorted output signal 116 of the DCSP circuit 114 to a predistorted analog signal 120. Typically, the predistorted analog signal 120 is an intermediate frequency (IF) signal or complex baseband. An RF up-converter 122 mixes the predistorted analog signal 120 with a local oscillator to produce a modulated carrier wave termed a low power RF signal 124. The low power RF signal 124 is amplified by an RF amplifier 126 to a high power RF signal 128.

The nonlinearities of the RF amplifier 126 are corrected by the DCSP circuit 114 such that the high power RF signal 128 exhibits relatively low distortion. A coupler 130, such as a Lange, a Hybrid, or a Quadrature coupler, provides an RF sample 132 of the high power RF signal 128.

An RF down-converter 134 converts the RF sample 132 down from a radio frequency signal to a down-converted signal 136, which is a relatively lower frequency. In one embodiment, the down-converted signal 136 is complex baseband. In another embodiment, the down-converted signal 136 is an IF signal. An analog-to-digital converter 138 converts the analog down-converted signal 136 to a digital feedback signal 140.

Typically, the down-converted signal 136, which is converted by the analog-to-digital converter 138, remains a relatively high bandwidth signal. In one embodiment, the down-converted signal 136 is converted by a relatively high-speed pipeline analog-to-digital converter (ADC), such as an AD9432 available from Analog Devices, Inc. In another embodiment, the down-converted signal 136 is converted by a Flash ADC. High-speed ADCs are relatively limited in dynamic range and become progressively more expensive as the dynamic range of the ADC increases.

The limited dynamic range of the high-speed ADCs used to monitor the down-converted signal 136 is a source of a problem. The RF sample 132 and the down-converted signal 136 contain at least one main signal, and further contain distortion artifacts of the main signal.

Figure 2:
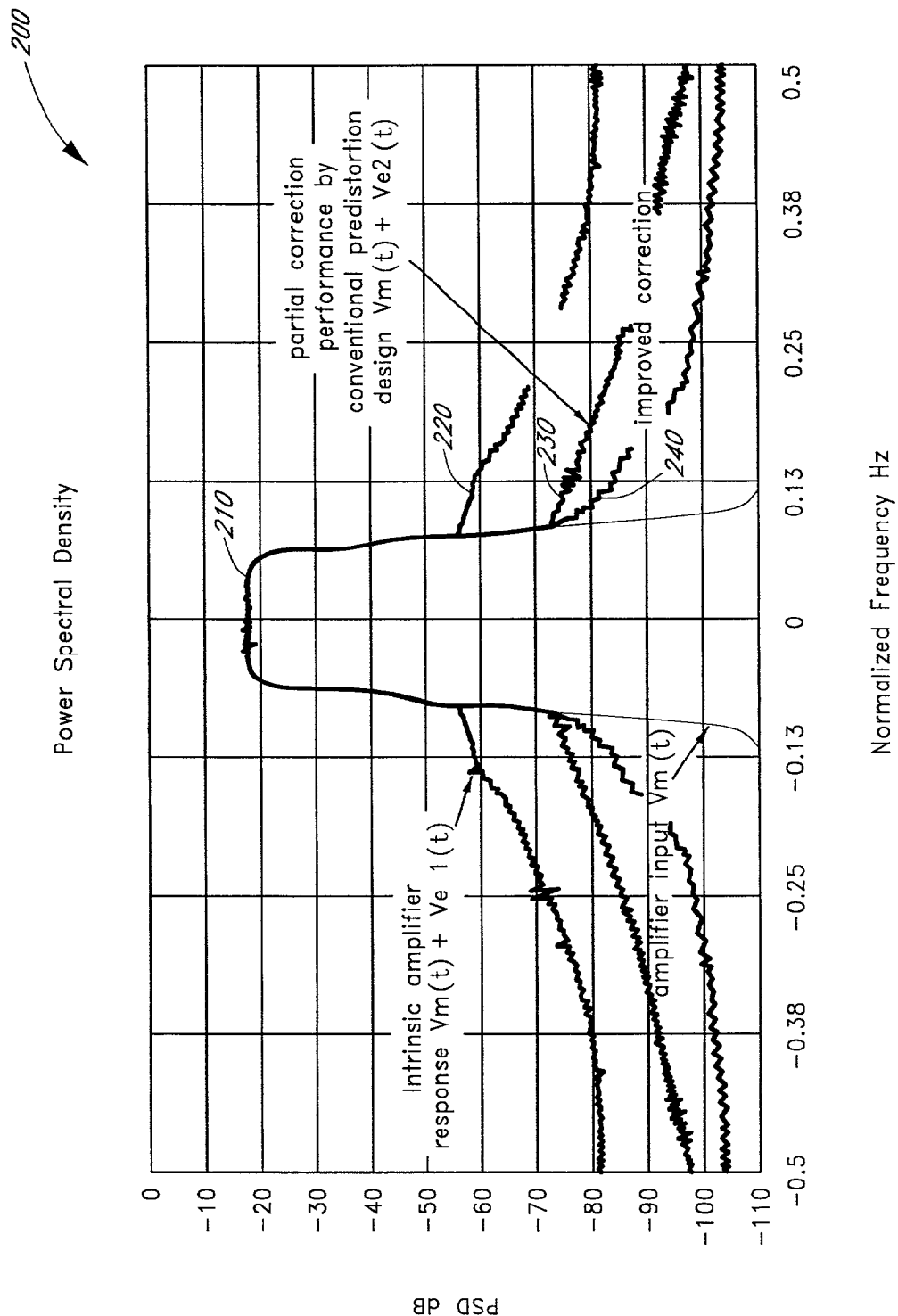
FIG. 2 illustrates a Power Spectral Density plot of the RF transmitter according to the conventional Adaptive Predistortion Linearization technique.

FIG. 2 is a power spectral density plot 200 of test results of conventional systems and one embodiment according to the present invention. The test were conducted with an amplifier input signal conforming to a 1900-megahertz (MHz) wideband CDMA signal, which is representative of a personal communication service (PCS) cellular communications signal. For clarity, the power density plot 200 is normalized over frequency.

As shown in FIG. 2, a main signal component 210 is much higher in magnitude than an intrinsic distortion 220 of the RF amplifier 126, i.e., the distortion artifacts 220 without predistortion linearization. The main signal component 210 is even higher in magnitude than a distortion 230 of the RF amplifier 126 with conventional predistortion linearization. For example, where the RF amplifier 126 is a Class AB RF power amplifier, the distortion and nonlinear artifacts can be buried 40 decibels (dB) below the main output signal.

When the analog-to-digital converter 138 monitors the down-converted signal 136, much of the dynamic range of the analog-to-digital converter 138 is used to accommodate the main output component 210 of the down-converted signal 136. As a result, only a relatively small portion of the ADC's dynamic range is used to quantize the error signal. Thus, conventional adaptive predistortion techniques rely upon relatively expensive ADCs with large dynamic ranges and yet, conventional adaptive predistortion techniques exhibit a relatively low sensitivity to the nonlinearity components of the RF output.

In a sample calculation, the dynamic range of a typical linear ADC is approximately 6 dB per bit, and a 10-bit and a 12-bit ADC exhibit approximately a 60-dB and a 72-dB dynamic range, respectively. Since approximately 40 dB of the dynamic range of the ADC is consumed by the main signal, only approximately 20 dB and 32 dB, respectively, of the dynamic range of the ADC remains for the error component. Thus, the error component is effectively converted by only 3 and 5 bits, respectively, of the 10-bit and the 12-bit ADCs.

Embodiments of the present invention advantageously cancel or filter a substantial portion of the main output signal from the down-converted signal 136 or digital baseband. By canceling or filtering at least a portion of the main output signal from the down-converted signal 136, embodiments of the present invention can advantageously convert the error signal with greater sensitivity. In one embodiment, the enhanced sensitivity allows a reduction of distortion, as shown by an improved correction 240 in FIG. 2.

Further details of embodiments of the present invention, which advantageously utilize the dynamic range of the analog-to-digital converter 138 more efficiently than conventional systems, will be described later in connection with FIGS. 3 and 4.

As further illustrated by FIG. 1, the digital feedback signal 140 is applied to an adaptive control processing and compensation estimator (ACPCE) circuit 142. The ACPCE circuit 142 compares the input signal 112 to the digital feedback signal 140. The ACPCE appropriately delays the input signal 112 to account for the delay of the digital feedback signal 140 through a first path 144. The ACPCE circuit 142 also scales the input signal 112 or the digital feedback signal 140 to account for the variations in gain encountered through amplification, coupling, and conversion stages.

Based on the computed difference between the input signal 112 and the digital feedback signal 140, the ACPCE circuit 142 updates the DCSP 114 via a state parameter update vector 146. The state parameter update vector 146 updates the predistortion kernel in the DCSP 114 and enhances the linearity correction of the DCSP 114.

Figure 3:
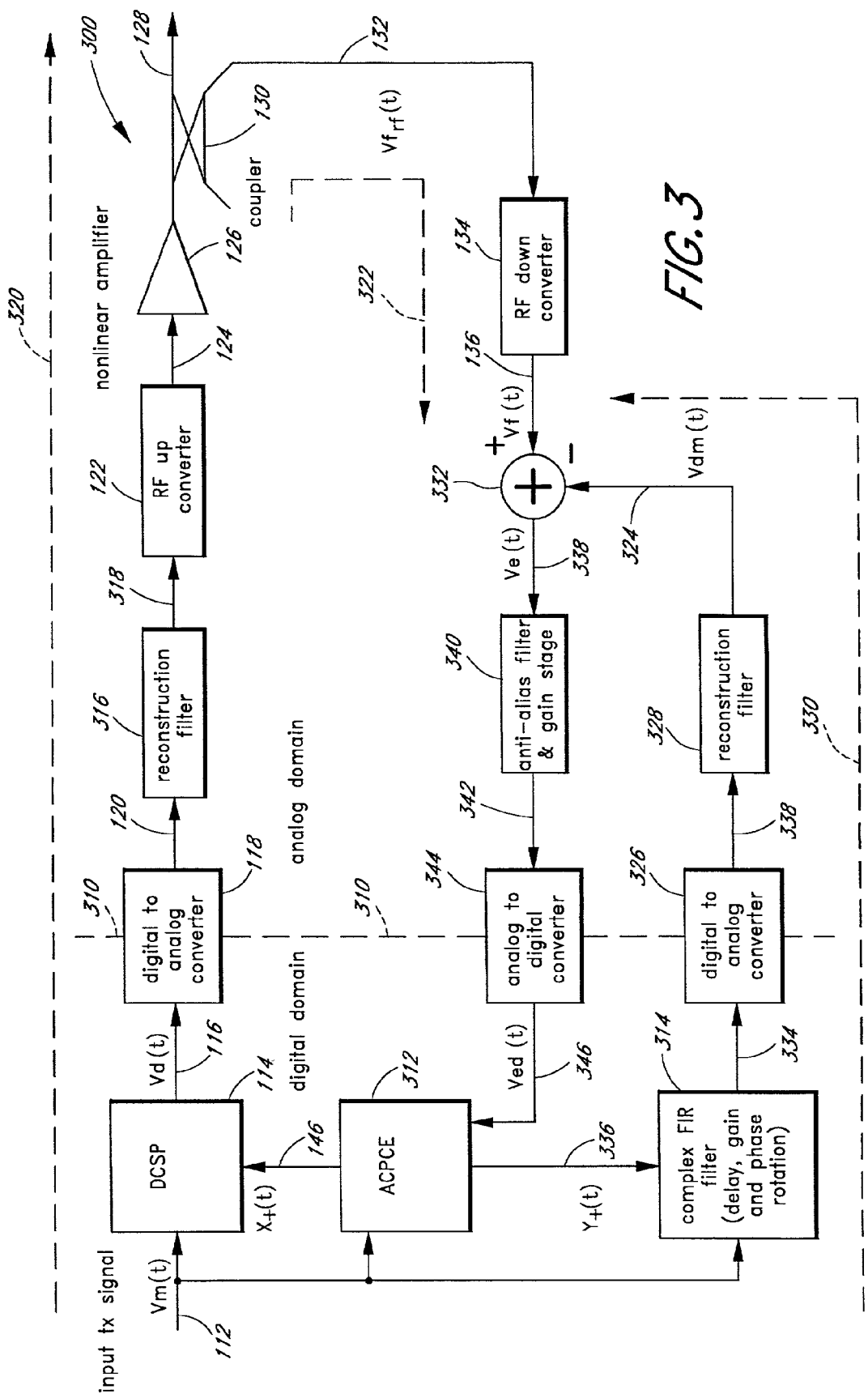
FIG. 3 illustrates a block diagram of an embodiment of an RF transmitter according to the present invention.

FIG. 3 illustrates a block diagram of an embodiment of an RF transmitter 300 according to the present invention. The RF transmitter 300 is again a mixed analog and digital system, where line 310 indicates the division between the analog portion and the digital portion of the RF transmitter 300.

The RF transmitter 300 receives the digital input signal, $V_m(t)$ 112. As shown in FIG. 3, the input signal 112 is already modulated with, for example, CDMA. The input signal 112 is applied to the DCSP circuit 114, which predistorts the input signal 112 to improve the linearity of the output of the RF transmitter 300. The DCSP circuit 114 references an internal predistortion kernel to determine how to predistort the input signal 112.

The input signal 112 is also applied to an adaptive control processing and compensation estimator (ACPCE) circuit 312 and a complex finite impulse response (FIR) filter 314. The ACPCE 312 and the complex FIR 314 filter will be described in greater detail later.

As described in connection with FIG. 1, the predistorted output signal 116 of the DCSP circuit 114 is applied to the digital-to-analog converter 118, which converts the predistorted output signal 116 of the DCSP circuit 114 to a predistorted analog signal 120. In one embodiment, the digital-to-analog converter 118 is an AD9772, which is available from Analog Devices, Inc. The RF transmitter 300 further includes a first reconstruction filter 316, which is a low pass filter that removes the quantization noise and higher Nyquist images from the output of the digital-to-analog converter 118. A reconstructed output 318 is applied to the RF up-converter 122, which mixes the reconstructed output 318 with a local oscillator to produce the carrier wave low power RF signal 124.

Of course, the DCSP circuit 114 can generate separate I and Q signals for phase modulated symbols and the digital-to-analog converter 118 can include separate converters for the I and Q signals, which are later combined in the RF up-converter 122. In another embodiment, the RF up-converter 122 further includes a modulator circuit and operates as a direct up-converter, thereby directly receiving the digital IF or I-Q data and transforming the data to the digital symbols as specified by the modulation scheme.

The low power RF signal 124 is amplified by the RF amplifier 126 to the high power RF signal 128. The RF outputs of several RF up-converters and of various modulation schemes can be combined and amplified by the RF amplifier 126 of the RF transmitter 300.

The nonlinear behavior of the RF amplifier 126 distorts the predistorted low power RF signal 124 such that the high power RF signal 128 exhibits relatively low distortion. The path from the input signal 112 to the high power RF signal 128 is referred to as a forward transmitting path 320.

The coupler 130 provides the RF down-converter 134 with the RF sample 132 of the high power RF signal 128. The RF down-converter 134 converts the RF sample 132 down from radio frequency to the down-converted signal 136, which is a relatively lower frequency. The path from the high power RF signal 128 to the down-converted signal 136 is referred to as a return path 322.

The down-converted signal 136 is advantageously combined at a node 332 with a delayed version of the input signal 324. The combination of the down-converted signal 136 with the delayed version of the input signal 324 increases the proportion of error components to main signal components in the analog domain to improve the efficiency with which an input range of an analog-to-digital converter (ADC) 344 detects the error components within the high power RF signal 128.

The input signal 112 passes through the complex FIR filter 314, a second digital-to-analog converter 326, and a second reconstruction filter 328, to become the delayed version of the input signal 324. The path from the input signal 112 to the delayed version of the input signal 324 is termed a side path 330.

The complex FIR filter 314 converts the input signal 112 to a delayed input signal 334. The delayed input signal 334 is delayed by the complex FIR filter 314 such that the delay of the side path 330 is approximately equal to the sum of the delays of the forward transmitting path 320 and the return path 322. The complex FIR filter 314 can further adjust the relative gain (or loss) and rotate the relative phase between the input signal 112 and the delayed input signal 334. A feedback state vector 336 from the ACPCE 312 provides the parameters for the adjustment and will be described in greater detail later. In another embodiment, the complex FIR filter 314 is instead, an infinite impulse response (IIR) filter.

The delayed input signal 334 is applied to the second digital-to-analog converter 326 and converted to analog form. In one embodiment, the second digital-to-analog converter 326 is an AD9772. The analog output 338 of the second digital-to-analog converter 326 is low pass filtered by the second reconstruction filter 328 to remove quantization noise and higher Nyquist images. The delayed version of the input signal 324 is the output of the second reconstruction filter 328.

The node 332 subtracts the delayed version of the input signal 324 from the down-converted signal 136, thereby advantageously canceling or filtering a substantial portion of a main signal component of the down-converted signal 136. It will be understood by one of ordinary skill in the art that the node 332 can be a summing node, where one of a main signal component of the delayed version of the input signal 324 or a main signal component of the down-converted signal 136 is the inverse of the other. In one embodiment, the summing node is an active op-amp summing junction. In another embodiment, the summing node is a resistive summing circuit. The output of the node is an error signal 338. Where the error signal 338 is defined as $V_e(t)$, the down-converted signal 136 as $V_f(t)$, and the delayed version of the input signal 324 as $V_{dm}(t)$, the node performs the following computation:

$$V_e(t)=V_f(t)-V_{dm}(t)$$

An anti-aliasing filter 340 low pass filters the error signal 338 and can further include a gain stage to conform a filtered output 342 of the anti-aliasing filter 340 to the input range of the ADC 344. The filtered output 342 is then converted to digital by the ADC 344. Advantageously, the main signal component of the down-converted signal 136 can be reduced by the subtraction with the delayed version of the input signal 324. As described in connection with FIG. 1, the main signal dominates the magnitude of the down-converted signal 136. Of course, as the magnitude of the down-converted signal 136 decreases, the gain stage within the anti-aliasing filter 340 can increase the magnitude of the filtered output 342 to conform the magnitude of the filtered output 342 to the input range of the ADC 344.

By separating the main signal component from the down-converted signal 136 through subtraction with the delayed version of the input signal 324, the input range of the ADC 344 can be more fully utilized. For example, where the main signal component is substantially removed from the down-converted signal 136, the error signal 338 corresponds substantially to the error signal component of the down-converted signal 136. Thus, nearly the full range of the ADC 344 measures the error component of the down-converted signal 136.

By contrast, in the conventional RF transmitter with adaptive predistortion as described in connection with FIG. 1, the entire down-converted signal 136, represented above as $V_f(t)$, is converted by the analog-to-digital converter 138. As described in connection with FIG. 1, the main signal dominates the magnitude of the down-converted signal 136, leaving only a few bits to quantize the error signal within the down-converted signal 136.

Returning to FIG. 3, a digital error signal 346 from the ADC 344 is applied to the ACPCE 312. Based on the content of the digital error signal 346, the ACPCE 312 can update the coefficients of the DCSP 114 through the digital feedback signal 140 to improve the predistortion characteristics of the DCSP 114 and thereby reduce the nonlinearity in the high power RF signal 128.

In one embodiment, the ACPCE 312 can also adaptively update the coefficients of the complex FIR filter 314 through the feedback state vector 336 to adjust the combination of the delayed version of the input signal 324 with the down-converted signal 136 at the node 332. The ACPCE 312 can adjust the delay, magnitude, and phase rotation of the complex FIR filter 314. One algorithm that can be used by the ACPCE 312 is to monitor the digital error signal 346 and adjust the delay, magnitude, and phase rotation of the complex FIR filter 314 to minimize power in the digital error signal 346. It will be understood by one of ordinary skill in the art that other components can be used to implement delays, magnitude adjustments, and phase rotations. For example, shift registers and dual port RAMs can implement delays. The magnitude adjustment and the phase rotations can be implemented with analog circuits.

Figure 4:
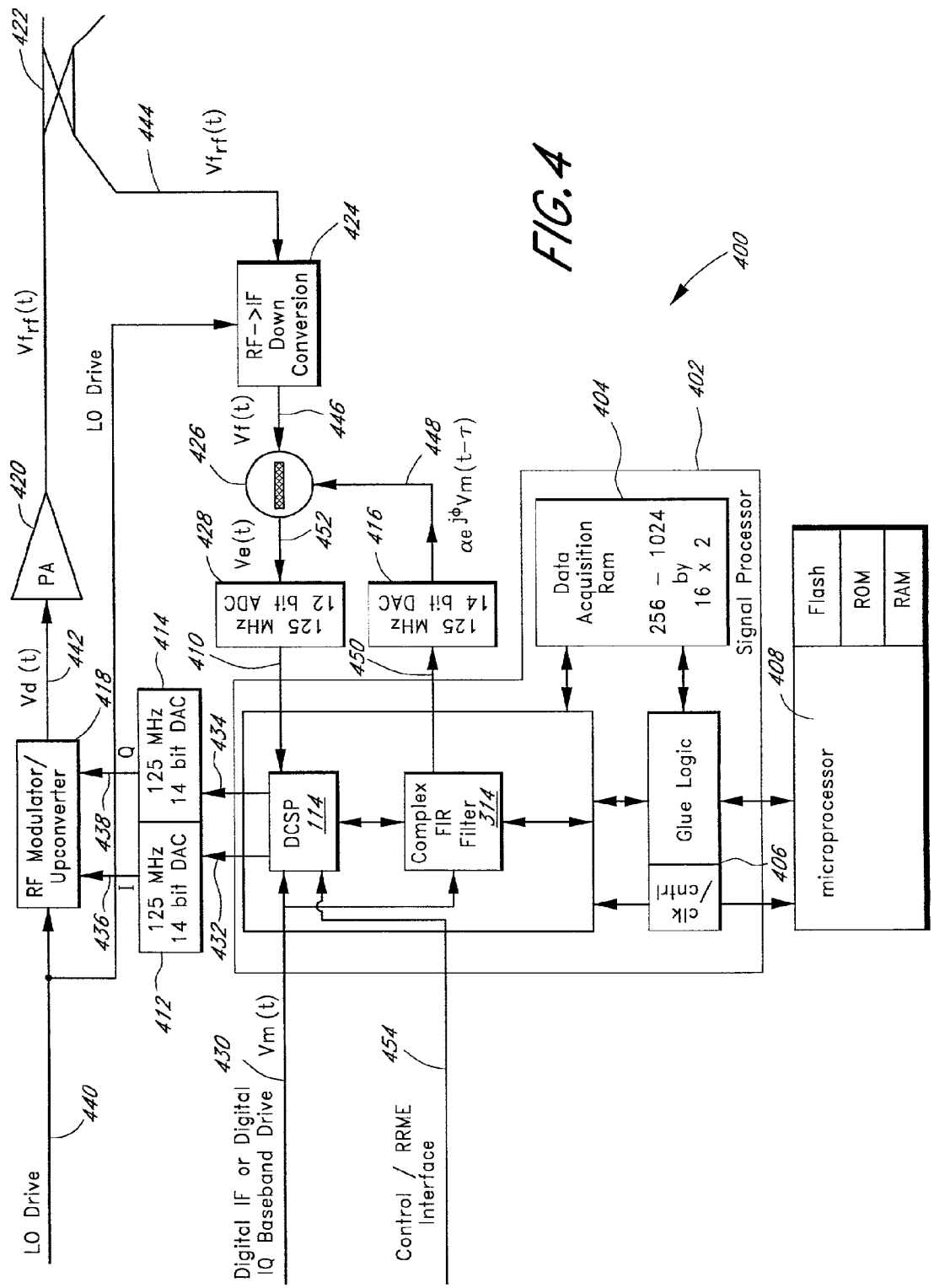
FIG. 4 illustrates an embodiment of an RF transmitter according to the present invention.

FIG. 4 illustrates another embodiment of an RF transmitter 400 according to the present invention. The RF transmitter 400 includes a signal processor 402, which implements the functions of the DCSP 114 and the complex FIR 314 described in connection with FIG. 3. The signal processor 402 is preferably implemented in dedicated hardware such as a custom application specific integrated circuit (ASIC) or a field programmable gate array (FPGA) so that the signal processor 402 can respond to a high data transfer rate in real time. Suitable FPGAs are available from vendors such as Xilinx, Inc.

The first DSP unit 402 can further include random access memory (RAM) 404 to allow the coefficients of the filters in the DCSP 114 and the complex FIR filter 314 to accept updates and to adapt to the running conditions of the RF transmitter 400. The RAM 404 also functions to store the characteristics of a digital error signal 410, which will be described in greater detail later. The signal processor 402 also includes a clock interface, control logic, and glue logic 406 to interface with a microprocessor 408.

The microprocessor 408 implements the functions of the ACPCE 312. The ACPCE 312 can execute periodically and does not have to operate in real time. Hence, the ACPCE 312 is preferably implemented in a microprocessor such as the 68000 series from Motorola, Inc., or a DSP chip such as the TMS320 series from Texas Instruments Incorporated. A microprocessor core or a DSP core can also be embedded within an ASIC, which can then implement the ACPCE 312 as well as the DCSP 114 and the complex FIR 314 within the same ASIC. Examples of licensable cores include the ARM7 from Advanced RISC Machines, Ltd., the Teak from DSP Group Inc., the Oak from DSP Group Inc., and the ARC from ARC Cores. Of course, the microprocessor 408 or DSP can further include Flash PROMS, ROMs, and other RAMs for program storage and execution. The ACPCE 312 monitors the digital error signal 410 and provides updates to the DCSP 114 and the complex FIR filter 314 to adaptively improve the linearity of the RF transmitter 400 by updating the coefficients of the filters in the DCSP 114 and the complex FIR filter 314.

The remainder of the RF transmitter 400 includes a first, a second, and a third digital-to-analog converter (DAC) 412, 414, 416, an RF modulator/up-converter 418, an RF power amplifier 420, a coupler 422, an RF down-converter 424, a combiner 426, and an analog-to-digital converter 428.

The signal processor 402 can be configured to accept either a digital IF signal or a digital IQ baseband signal as an input signal 403. The DCSP 114 within the signal processor 402 predistorts the input signal 430. As shown in FIG. 4, the signal processor 402 provides the first and the second DACs 412, 414 with predistorted I and Q signals 432, 434. In one embodiment, the first and the second DACs 412, 414 are 14-bit DACs that convert digital I and Q signals to analog I and Q signals 436, 438 at the rate of 125 MHz. The RF modulator/up-converter 418 receives a local oscillator signal 440 and directly modulates the analog I and Q signals 436, 438 to the carrier frequency. The RF power amplifier 420 amplifies a modulated output 442 of the RF modulator/up-converter 418.

The RF down-converter 424 receives a sample 444 of the output of the RF power amplifier 420 from the coupler 422. In one embodiment, the RF down-converter 424 mixes the sample 444 with the same local oscillator signal 440 used by the RF modulator/up-converter 418.

A down-converted output 446 of the RF down-converter 424 is applied to an input of the combiner 426. An output 448 of the third DAC 416 provides the other input of the combiner 426. The signal processor 402 and the third DAC 416 delay by time $\tau$, amplitude scale by factor $\alpha$, and phase shift by angle $\Phi$, the output 448 of the third DAC 416 with respect to the input signal 420. In one embodiment, the third DAC 416 is a 14-bit DAC that converts data at the rate of 125 MHz. The combiner 426 combines the output 448 of the third DAC 416 with the down-converted output 446 such that the main signal component of the down-converted output 446 is reduced in magnitude. If $V_m(t)$ represents the digital input signal 430, the analog output 448 of the third DAC 416 can be represented as:

$$\alpha e^{j\Phi} V_m(t-\tau)$$

The combining of the analog output 448 of the third DAC 416 with the down-converted output 446 advantageously reduces the main signal component of the down-converted output 446 and allows relatively more of the input range of the ADC 428 to capture the error signal component of the down-converted output 446. In one embodiment, the ADC 428 is a 12-bit Flash ADC that samples an analog error signal output 452 of the combiner 426 at a rate of 125 MHz. The output of the ADC 428 is the digital error signal 410, which is eventually used by the microprocessor 408, which implements the ACPCE 312, to update the coefficients of the DCSP 114 and the complex FIR filter 314 of the signal processor 402.

The signal processor 402 can further include a control/Radio Resource Management Entity (RRME) interface 454 to initiate predistortion, configure the frequencies of conversion, configure the number of bits of ADC and DAC conversion, and the like.

In one embodiment, the intended bandwidth of the RF transmitters 300, 400 does not extend substantially beyond one octave of the carrier frequency, i.e., twice the carrier frequency, to avoid the second harmonic of the carrier frequency.

Embodiments of the present invention more efficiently quantize the error signals of the outputs of the RF transmitters 300, 400. The more efficient utilization of an ADC used to sample error in an down-converted signal allows an ADC with the same number of bits to quantize the error signal in smaller steps and improve the sensitivity of the RF transmitters 300, 400 to nonlinearities. The enhanced sensitivity can be used to provide more accurate updates to the DCSP 114 and thereby improve the linearity of the RF transmitters 300, 400. The improved linearity can be used, for example, to increase the symbol rate or increase the power of the RF transmitters 300, 400. The more efficient utilization of the analog-to-digital converters also allows the use of a less expensive ADC with a reduced number of quantization bits.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. In a power amplifier system in which a digital input transmission signal is adaptively predistorted to compensate for non-linearities in an amplification process based on a difference between a desired and an observed amplifier output, a method of generating a digital error signal that accurately represents said difference, comprising:
   adaptively processing the digital input transmission signal at least partially in response to the digital error signal to generate a first modified signal that complements non-linearities resulting from the amplification process;
   converting the first modified signal to analog form to produce an analog modified signal which is related to a signal that is amplified by the amplification process;
   down-converting a radio frequency (RF) signal that represents an actual output of the amplifier system to generate a feedback signal;
   processing the digital input transmission signal to providing the desired output signal;
   converting the desired output signal to analog form to produce an analog delayed signal;
   taking a difference between the feedback signal and the analog delayed signal to generate an analog error signal;
   scaling the analog error signal to produce a scaled error signal that substantially corresponds to a range of an analog-to-digital converter;
   using the analog-to-digital converter to convert the scaled error signal to digital form to produce the digital error signal; and
   wherein processing the digital transmission signal to provide the desired output signal further comprising adaptively adjusting the processing to reduce a magnitude of the analog error signal.

2. The method as in claim 1, wherein processing the digital input transmission signal to generate the desired signal further comprises phase rotating the desired signal relative to the input transmission signal.

3. The method as in claim 1, wherein processing the digital input transmission signal to generate the desired signal further comprises amplitude scaling the desired signal relative to the input transmission signal.

4. The method as in claim 1, wherein processing the digital input transmission signal to generate the desired signal further comprises delaying the desired signal relative to the input transmission signal such that the desired signal is substantially time aligned with the feedback signal.

5. The method as in claim 2, wherein adaptively processing the digital input transmission signal further comprises amplitude scaling the input transmission signal.

6. A method of generating an error signal that can be used to reduce distortion in a radio frequency (RF) output signal of an RF transmitter, the method comprising:
 receiving an RF sample of the RF output signal of the transmitter;
 down-converting the RF sample of the RF output signal to a down-converted signal;
 receiving an input signal of the transmitter, where the input signal is digital;
 delaying the input signal to produce a delayed input signal to approximately time align an analog delayed input signal with the down-converted signal;
 converting, from digital to analog, the delayed input signal to the analog delayed input signals;
 combining the down-converted signal with the analog delayed input signal to produce a modified down-converted signal such that an amplitude of the modified down-converted signal is reduced relative to an amplitude of the down-converted signal;
 converting the modified down-converted signal, from analog to digital, to produce the error signal; and
 wherein delaying the input signal further comprises adaptively adjusting the delay in response to the error signal to further reduce the amplitude of the modified down-converted signal.

7. A method of generating an error signal that can be used to reduce distortion in a radio frequency (RF) output signal of an RF transmitter, the method comprising:
 receiving an RF sample of the RF output signal of the transmitter;
 down-converting the RF sample of the RF output signal to a down-converted signal;
 receiving an input signal of the transmitter, where the input signal is digital;
 delaying the input signal to produce a delayed input signal to approximately time align an analog delayed input signal with the down-converted signal;
 converting, from digital to analog, the delayed input signal to the analog delayed input signal;
 combining the down-converted signal with the analog delayed input signal to produce a modified down-converted signal such that an amplitude of the modified down-converted signal is reduced relative to an amplitude of the down-converted signal;
 converting the modified down-converted signal, from analog to digital, to produce the error signal; and
 phase rotating the delayed input signal relative to the input signal to further reduce the amplitude of the modified down-converted signal.

8. The method as defined in claim 7, further comprising adaptively phase rotating the delayed input signal relative to the input signal in response to the error signal to further reduce the amplitude of the modified down-converted signal.

9. A method of generating an error signal that can be used to reduce distortion in a radio frequency (RF) output signal of an RF transmitter, the method comprising:
 receiving an RF sample of the RF output signal of the transmitter;
 down-converting the RF sample of the RF output signal to a down-converted signal;
 receiving an input signal of the transmitter, where the input signal is digital;
 delaying the input signal to produce a delayed input signal to approximately time align an analog delayed input signal with the down-converted signal;
 converting, from digital to analog, the delayed input signal to the analog delayed input signal;
 combining the down-converted signal with the analog delayed input signal to produce a modified down-converted signal such that an amplitude of the modified down-converted signal is reduced relative to an amplitude of the down-converted signal;
 converting the modified down-converted signal, from analog to digital, to produce the error signal; and
 scaling the delayed input signal relative to the down-converted signal such that the amplitude of the modified down-converted signal is further reduced.

10. The method as defined in claim 9, further comprising adaptively scaling the delayed input signal relative to the down-converted signal in response to the error signal such that the amplitude of the modified down-converted signal is further reduced.

11. A method of generating an error signal that can be used to reduce distortion in a radio frequency (RF) output signal of an RF transmitter, the method comprising:
 receiving an RF sample of the RF output signal of the transmitter;
 down-converting the RF sample of the RF output signal to a down-converted signal;
 receiving an input signal of the transmitter, where the input signal is digital;
 delaying the input signal to produce a delayed input signal to approximately time align an analog delayed input signal with the down-converted signal;
 converting, from digital to analog, the delayed input signal to the analog delayed input signal;
 combining the down-converted signal with the analog delayed input signal to produce a modified down-converted signal such that an amplitude of the modified down-converted signal is reduced relative to an amplitude of the down-converted signal;
 converting the modified down-converted signal, from analog to digital, to produce the error signal; and
 adaptively scaling an amplitude of the modified down-converted signal in response to the error signal to conform the amplitude of the modified down-converted signal to an input range of an analog-to-digital converter.

12. A method of responsively filtering a first component from a first signal to efficiently utilize an input range of an analog-to-digital converter used to detect and measure a second component of the first signal, the method comprising:
 receiving the first signal;
 receiving a second signal, where the second signal is related to the first component of the first signal;
 delaying the second signal to align the second signal with the first component of the first signal;
 subtracting the delayed second signal from the first signal to generate an error signal;
 applying the error signal to the analog-to-digital converter; and adjusting an amplitude of the second signal relative to the first signal to decrease an amplitude of the error signal.

13. A method of responsively filtering a first component from a first signal to efficiently utilize an input range of an analog-to-digital converter used to detect and measure a second component of the first signal, the method comprising:

receiving the first signal;
receiving a second signal, where the second signal is related to the first component of the first signal;
delaying the second signal to align the second signal with the first component of the first signal;
subtracting the delayed second signal from the first signal to generate an error signal;
applying the error signal to the analog-to-digital converter; and
adjusting a phase of the second signal versus the first signal to decrease an amplitude of the error signal.

14. A radio frequency (RF) transmitter with adaptive predistortion comprising:

a predistortion circuit that predistorts an input signal to a predistorted input signal in response to maintained coefficients in a predistortion kernel, where the predistortion is substantially complementary to an intrinsic distortion in an RF power amplifier;
an RF up-converter, which produces a modulated carrier wave from the predistorted input signal;
the RF power amplifier, which amplifies the modulated carrier wave;
a coupler, which provides an RF sample of the amplified modulated carrier;
an RF down-converter, which converts the RF sample of the amplified modulated carrier wave to a down-converted signal;
a digital filter adapted to delay the input signal to produce a delayed input signal;
a digital-to-analog converter that converts the delayed input signal to an analog delayed input signal;
a summing node adapted to combine the analog delayed input signal with the down-converted signal to generate a summed output such that the analog delayed input signal and the down-converted signal at least partially destructively interfere;
an analog-to-digital converter that converts the summed output to a digital summed output; and
an adaptive control processing and compensation estimator circuit that monitors the digital summed output and provides updates to the predistortion circuit such that the predistortion of the input signal remains substantially complementary to the intrinsic distortion of the RF power amplifier, wherein the adaptive control processing and compensation estimator circuit further updates the digital filter at least partially in response to the digital summed output, where the updates vary the delay of the digital filter to increase the destructive interference at the summing node.

15. A radio frequency (RF) transmitter with adaptive predistortion comprising:

a predistortion circuit that predistorts an input signal to a predistorted input signal in response to maintained coefficients in a predistortion kernel, where the predistortion is substantially complementary to an intrinsic distortion in an RF power amplifier;
an RF up-converter, which produces a modulated carrier wave from the predistorted input signal;
the RF power amplifier, which amplifies the modulated carrier wave;
a coupler, which provides an RF sample of the amplified modulated carrier;
an RF down-converter, which converts the RF sample of the amplified modulated carrier wave to a down-converted signal;
a digital filter adapted to delay the input signal to produce a delayed input signal;
a digital-to-analog converter that converts the delayed input signal to an analog delayed input signal;
a summing node adapted to combine the analog delayed input signal with the down-converted signal to generate a summed output such that the analog delayed input signal and the down-converted signal at least partially destructively interfere, wherein the digital filter further phase rotates and amplitude scales the delayed input signal to increase the destructive interference at the summing node;
an analog-to-digital converter that converts the summed output to a digital summed output; and
an adaptive control processing and compensation estimator circuit that monitors the digital summed output and provides updates to the predistortion circuit such that the predistortion of the input signal remains substantially complementary to the intrinsic distortion of the RF power amplifier.

16. The RF transmitter as defined in claim 15, wherein the adaptive control processing and compensation estimator circuit responds to the digital summed output to further update the digital filter to vary the delay, to vary the phase rotation, and to vary the amplitude scaling of the delayed input signal to increase the destructive interference at the summing node.

17. A circuit that generates an error signal that can be used by a pre-distortion circuit to reduce a distortion in a radio frequency (RF) output signal of an RF transmitter, the circuit comprising:

a digital filter adapted to delay and phase rotate an input signal of the RF transmitter along a side path, where the delay is configurable to approximately coincide with a first delay in time of a forward transmitting path and a return path with a second delay in time of the side path;
a first conversion circuit adapted to convert an output of the digital filter to a delayed version of the input signal, where the delayed version of the input signal is analog;
an RF down-converter adapted to convert an RF sample of the RF output signal to a down-converted signal;
a differencing circuit adapted to combine the output of the conversion circuit with the down-converted signal to produce a difference signal such that a main signal component of the down-converted signal is reduced in the difference signal by subtraction of the delayed version of the input signal from the down-converted signal; and
a second conversion circuit adapted to convert the difference signal to a digital form.

18. The circuit that is defined in claim 17, wherein the differencing circuit is a summing circuit, and where a main signal component of the delayed version of the input signal is substantially out of phase with respect to the main signal component of the down-converted signal.

* * * * *